June 30, 1953     H. R. TEAR     2,643,739
RELIEF DEVICE FOR LUBRICATING SYSTEMS
Filed July 13, 1949
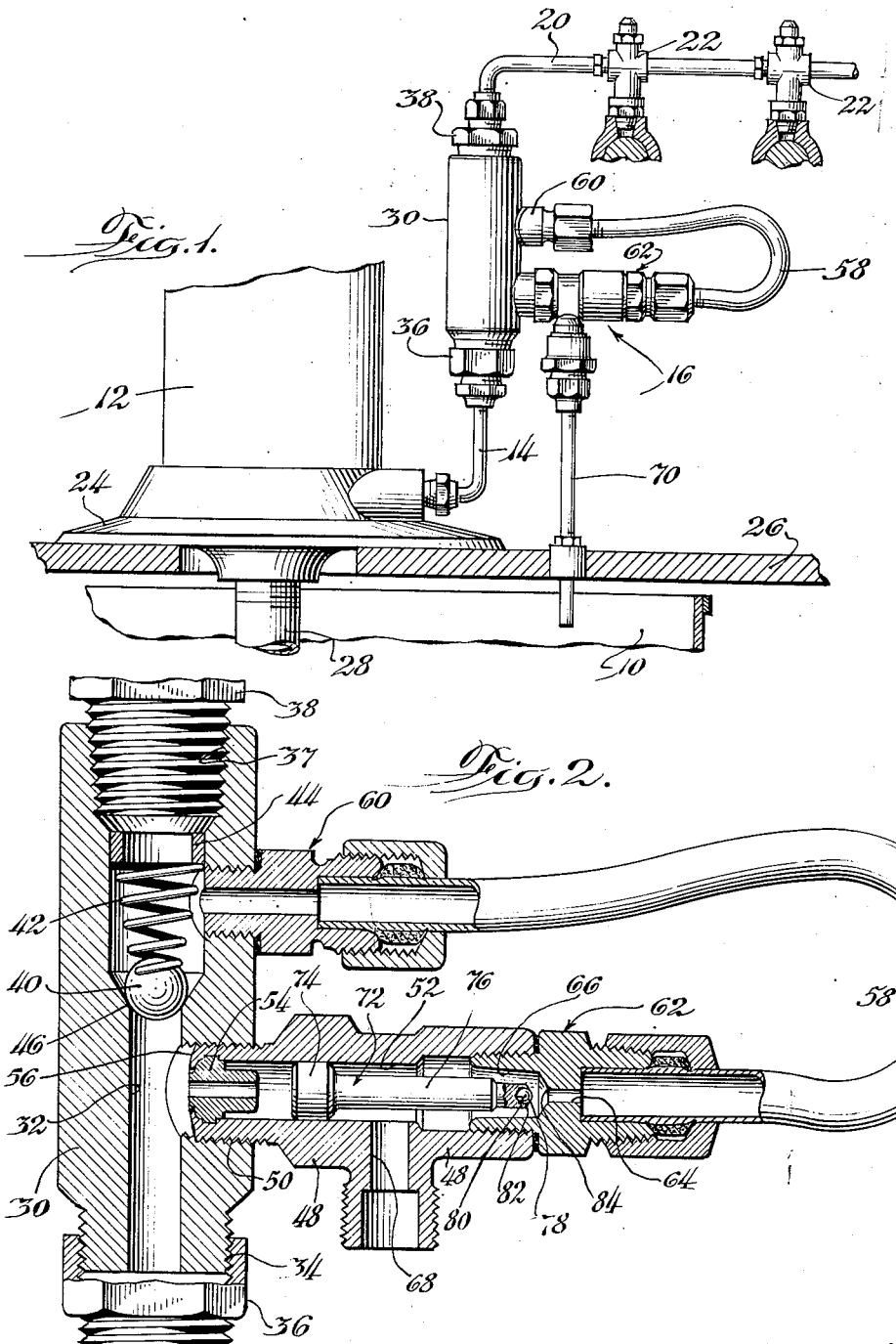

Patented June 30, 1953

2,643,739

UNITED STATES PATENT OFFICE 2,643,739

RELIEF DEVICE FOR LUBRICATING SYSTEMS

Harry R. Tear, Evanston, Ill., assignor to Stewart-Warner Corporation, Chicago, Ill., a corporation of Virginia Application July 13, 1949, Serial No. 104,544

4 Claims. (Cl. 184—7)

The present invention relates generally to lubricating systems and more particularly to an automatically operating valve for relieving the pressure in a lubricating system in the intervals between the application of fluid under pressure to the system.

An object of the invention is to provide a new and improved pressure relief device which operates automatically to relieve the pressure on the inlet end of the line in a lubricating system through a bypass around the pump of the system when the application of lubricant under pressure to the line ceases.

Another object of the invention is to provide a new and improved lubricating system having a valve-controlled bypass means for the inlet end of the line which closes automatically upon the application of lubricant under pressure to the line, and which opens automatically to relieve the pressure in the line when application of pressure to the line ceases.

A further object of the invention is to provide an improved bypass controlling valve of the type set forth in the foregoing objects which operates solely in response to changes in the pressure of the lubricant so that need for springs or other means to operate the valve is eliminated.

A still further object of the invention is the provision of a valve controlled bypass means as set forth in the foregoing objects which is exceedingly simple in construction, may be economically manufactured, and which will operate satisfactorily under widely varying conditions of operation.

These and other objects, advantages, and capabilities of the invention will become apparent from the following description, in which reference is had to the accompanying drawings, wherein:

Fig. 1 is a diagrammatic view of a fragment of a lubricating system showing the improved pressure relieving means for the system installed therein; and Fig. 2 is a sectional view through the improved pressure relieving means of the present invention.

In the diagrammatically illustrated portion of a single line lubricating system, shown in Fig. 1, a fragment of a source of lubricant supply, which may be a drum or other container, is indicated at 10. Lubricant is drawn from this source by a pump 12 and delivered under pressure to an outlet conduit 14 which is connected to the inlet end of the improved pressure relief device indicated in its entirety by the number 16. This relief device has an outlet connected to the inlet end of a conduit or line 20 forming part of a single line lubricating system.

Only representative parts of this system are shown in Fig. 1, but such systems conventionally include a plurality of measuring devices 22 interconnected by the conduit 20 and each associated with a bearing to be supplied with lubricant. Upon the application of fluid under pressure to the line, the measuring devices progressively discharge measured charges of lubricant to the bearings with which they are associated. After all the measuring devices have operated, operation of the pump 12 is discontinued by automatic controls, or by manually operated means. Structure for accomplishing this is known and is, therefore, not herein shown or described in detail. It will be understood that the measuring valves in a system are associated with a group of bearings for one machine, or group of machines.

The pump 12 may be of any known suitable type and may be operated by a conventional air or electric motor (not shown). This pump has a base 24 which may be secured to a counter or platform 26 under which the container 10 is located, or it may be secured directly to the top or cover of the container. A tube 28 depending from the base of the pump may support a pump cylinder and piston (not shown) near the bottom of the container 10 and may form a housing for the piston rod for operating the piston in the pumping cylinder. It may also form an outlet passageway for lubricant from the pump cylinder to the outlet of the pump. Since pumps of various types available on the market may be used, a detailed description of the pump is unnecessary.

Referring to Fig. 2, it will be seen that the pressure relief device 16 includes an elongated body member 30 which has a longitudinally extending duct or passageway 32 formed therein and has a threaded inlet end 34 adapted to be detachably connected to the outlet conduit 14 leading from the pump by suitable coupling means 36. A threaded outlet 37 for the passageway 32 is connected to the end of the line 20 by coupling means 38.

Intermediate the inlet and outlet ends of passageway 32 there is a ball check valve 40 to prevent return flow of lubricant from the line to the inlet side of passageway 32. A spring 42 reacting between a bushing 44 press-fitted in the outlet end of the passageway biases the valve toward a valve seat 46 formed in the passageway, but the pump 12 develops sufficient pressure to maintain the valve 40 open while the pump is operating. However, when the pump 12 stops operating spring 42 closes check valve 40, thus trapping the lubricant on the outlet side of the check valve so that the pressure in the line 20 remains at some relatively high value. The present invention includes novel means for relieving this pressure.

This novel means includes a valve casing 48 which may be secured to the tubular body member 30 by threading its inner end 50 into an aperture 56 in the tubular body member 30 communicating radially with the passageway 32 on the inlet side of check valve 40. The valve casing has a cylindrical bore 52, the inner end of which communicates with the passageway 32 on the inlet side of check valve 40 through an apertured plug or bushing 54 press-fitted in the end of bore 52 and also held in position by deforming inwardly the threaded end of the valve casing 48.

The opposite end of the valve casing 48 communicates with the side of the passageway 32 on the outlet side of the check valve 40 through a pressure relief channel or conduit 58 secured at one end to the valve casing and at the other end to a suitable connection fitting 60 threaded into a tapped bore intersecting the passageway 32 radially on the outlet side of the check valve 40.

A similar connection is made between the other end of the conduit 58 and the valve casing 48. In this case, however, the connection includes a fitting 62, which is threaded into the enlarged outer end of the bore 52 in the valve casing, and has a bore 64 of reduced diameter, and an enlarged bore 66 which communicates with the interior of the valve casing 48.

Valve casing 48 has a vent 68, which may be connected to a return pipe or conduit 70, discharging freely into container 10. Communication between the passageway 32 in the tubular body member 30 and the vent 68 is controlled by a hydraulic operator in the form of a piston valve 72 which has a head or piston 74 slidable in the bore 52. Piston 74 has slight clearance in the bore 52 permitting constant but minute leakage of lubricant from the bushing 54 to the vent 68 while there is pressure on the inlet side of passageway 32. A stem 76 on the piston 74 carries a ball valve 78 in its end. A poppet type valve 78 of substantially lesser effective area than the piston 74 is loosely held in a recess 80 formed in the end of stem 76 by a flange 82 formed by spinning the ends of the recess. This ball valve engages a seat 84 formed at the inner end of the small bore 64 in the fitting 62 to close communication between the outlet side of passageway 32 and the vent 68 under circumstances to be described.

In Fig. 2 the relief valve is shown in the position it assumes when the pump is not operating, at which time both ends of the passageway 32 are at substantially atmospheric pressure. When the pump 12 resumes operation, the pressure on the inlet side of passageway 32 exceeds that on the outlet side 37 due to the pressure drop across the loaded check valve 40. This pressure is transmitted to the valve chamber 48 through bushing 54 and acts on the piston 74 causing the valve member 72 to move to the right until the ball valve 78 engages upon the seat 84. Since the leakage past the piston 74 is minute compared with the discharge of the pump, the check valve 40 will be maintained open while the pump is operating and the valve 78 will remain seated to cut off communication between the outlet side of the passageway 32 and the vent 68 thus preventing bypassing of lubricant from the system while the pump continues to operate.

This condition will prevail until operation of the pump 12 is discontinued. Thereupon the check valve 40 closes and the pressure in passageway 32 on the inlet side of this valve is relieved by leakage of lubricant past the piston 74 and to the vent 68 while that on the outlet side remains the same for the time being because the relatively large area of the piston 74 subject to the pressure on the inlet side of passageway 32 compared with the small area of the ball valve 78 subject to the pressure in the outlet side of passageway 32 results in the ball valve 78 being held seated. However, when the pressure in the inlet side of passageway 32 falls to some fraction of that in the outlet side thereof, the valve member 72 will be moved in a direction to unseat ball valve 78 by the pressure of lubricant on the outlet side of check valve 40. This pressure is transmitted to the ball valve 78 through fitting 60, conduit 58, and bore 64 in fitting 62. Communication between the line 20 and the vent 68 is thus established so that back pressure in the line is relieved.

From the above description of the construction and operation of the invention, it will be apparent that a device of exceedingly simple construction has been provided, which nevertheless is positive in its operation, and has few parts to get out of order. This device operates automatically and in response to the application of lubricant under pressure to the line to close the bypass from the line, and to open the bypass when the application of pressure to the line ceases.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. A device for relieving pressure in a fluid-conveying line when the application of fluid under pressure to the line ceases, comprising a body adapted to be interposed between the source of fluid and the line and having a duct extending through the same and a check valve in the duct, means forming a passageway having communication with the duct in said body on opposite sides of said check valve including a vent and a port between said vent and the outlet side of said check valve, and a differential valve slidable in a portion of said passageway including a head slidable in the said portion of said passageway between the inlet side of the check valve and the vent having slight clearance with the said portion of said passageway to allow minute leakage between the inlet side of said duct and said vent for relieving the pressure in the inlet side of said duct when said check valve closes, and a part to close said port when said differential valve moves in response to a greater pressure on the inlet side of the check valve than on the outlet side thereof, said port being of small cross-sectional area relative to the head of said differential valve so that the latter will move in a direction to open said port only when the pressure on the outlet side of the check valve exceeds that on the inlet side by a predetermined amount.

2. A pressure relief device adapted to be interposed between a source of lubricant under pressure and the lubricant-conveying line of a lubricating system, comprising a body having a passage therethrough with an outlet end adapted to be connected to said line and an inlet end adapted to be connected to said source of lubricant, a check valve between said inlet and outlet, means forming a valve chamber having a cylindrical bore, a vent for said chamber, means for establishing communication between the inlet side of said passage and one end of said bore, other means for establishing communication between the outlet side of the passage and the other end of said bore including a relatively small port in the valve chamber, and means for controlling communication through the port including a valve having a piston slidable in said bore between the end thereof connected to the inlet side of the passage and the vent in response to a pressure differential across the passage, and a part adapted to close said port when the valve moves in response to a greater pressure at the inlet than the outlet side of said passage, said piston having sufficient clearance in said bore to allow slight leakage between the inlet side of said passage and said vent for relieving pressure in the said inlet side when the check valve closes, said port being of small cross-sectional area relative to said piston so that a pressure must exist in the outlet side of the passage exceeding the pressure on the inlet side by a predetermined amount before the valve will move in a direction to open the port.

3. In a lubricating system, an intermittently operated pump having means forming an outlet passageway, a check valve in said passageway for preventing return flow of lubricant to the pump, means forming a pressure relief channel for the flow of lubricant from the outlet end of the outlet passageway to a low pressure space, a poppet type valve of relatively small diameter operable to close said channel, means forming a cylinder of diameter substantially greater than that of the poppet valve and having one end in communication with the inlet end of said outlet passageway and having its other end in communication with a low pressure space, a piston freely slidable in the cylinder, and an operative connection between the piston and the poppet valve to hold the latter closed during the time that the pump is operating to maintain a substantial pressure at the inlet end of the outlet passageway.

4. In a lubricating system, an intermittently operated pump, means connected to the outlet of the pump and forming an outlet passageway, a check valve in said passageway for preventing return flow of lubricant to the pump, means forming a pressure relief channel for the flow of lubricant from the outlet end of the outlet passageway to a low pressure space, a poppet valve of relatively small diameter operable to close said channel, a hydraulic operator including a chamber having a movable wall of effective area substantially greater than that of the poppet valve, means connecting the chamber with the inlet end of said outlet passageway, said hydraulic operator being formed to provide a minute passage for leakage of lubricant from the chamber to the low pressure space, and an operative connection between the movable wall of the hydraulic operator and the poppet valve to hold the latter closed during the time that the pump is operating to maintain a substantial pressure at the inlet end of the outlet passageway.

HARRY R. TEAR.

References Cited in the file of this patent

UNITED STATES PATENTS

| Number | Name | Date |
| --- | --- | --- |
| 1,726,625 | McCarty | Sept. 3, 1929 |
| 1,795,034 | Murphy | Mar. 3, 1931 |
| 2,328,812 | Klein | Sept. 7, 1943 |
| 2,503,424 | Snyder | Apr. 11, 1950 |